Figure 1:
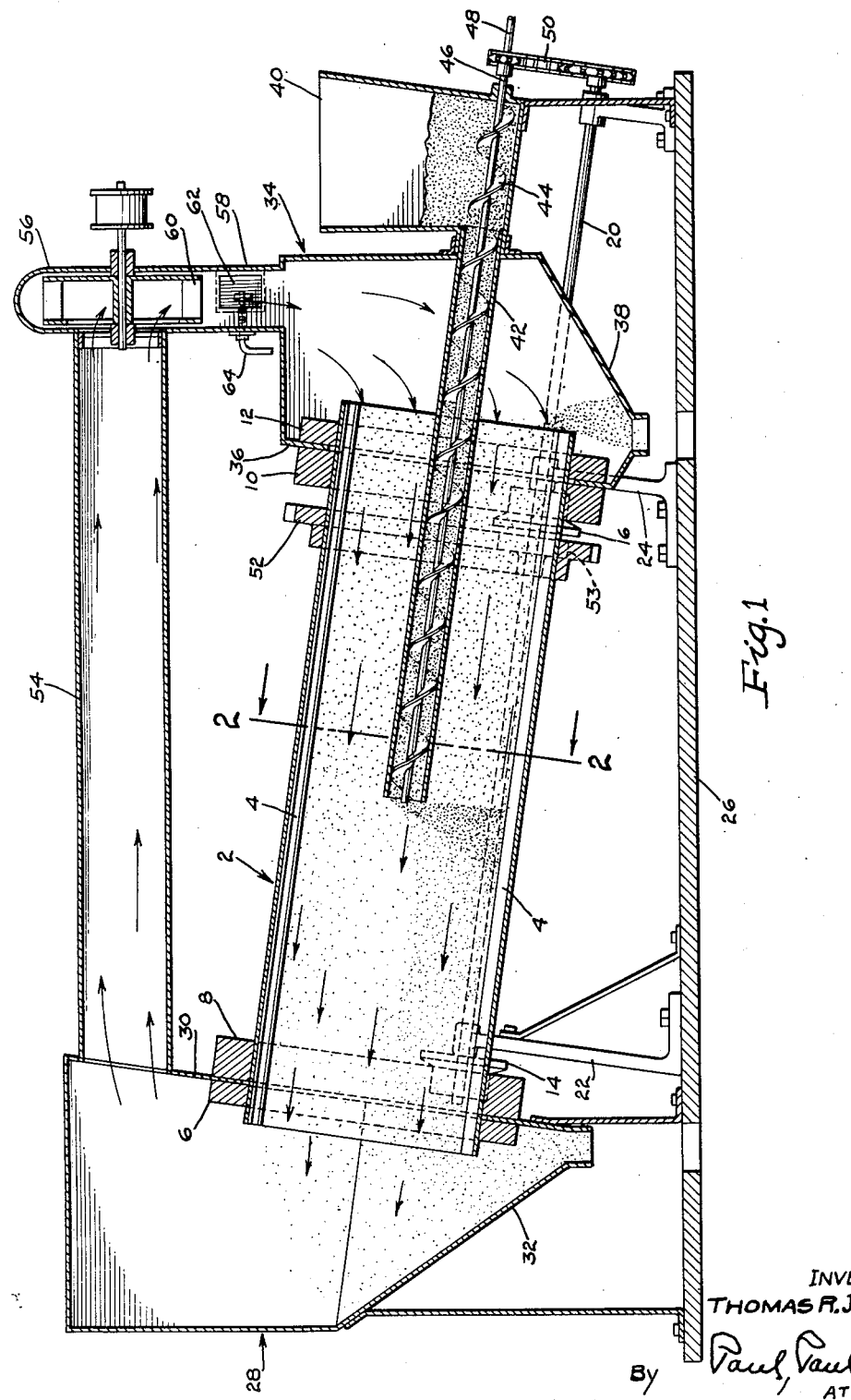
Figure 2:
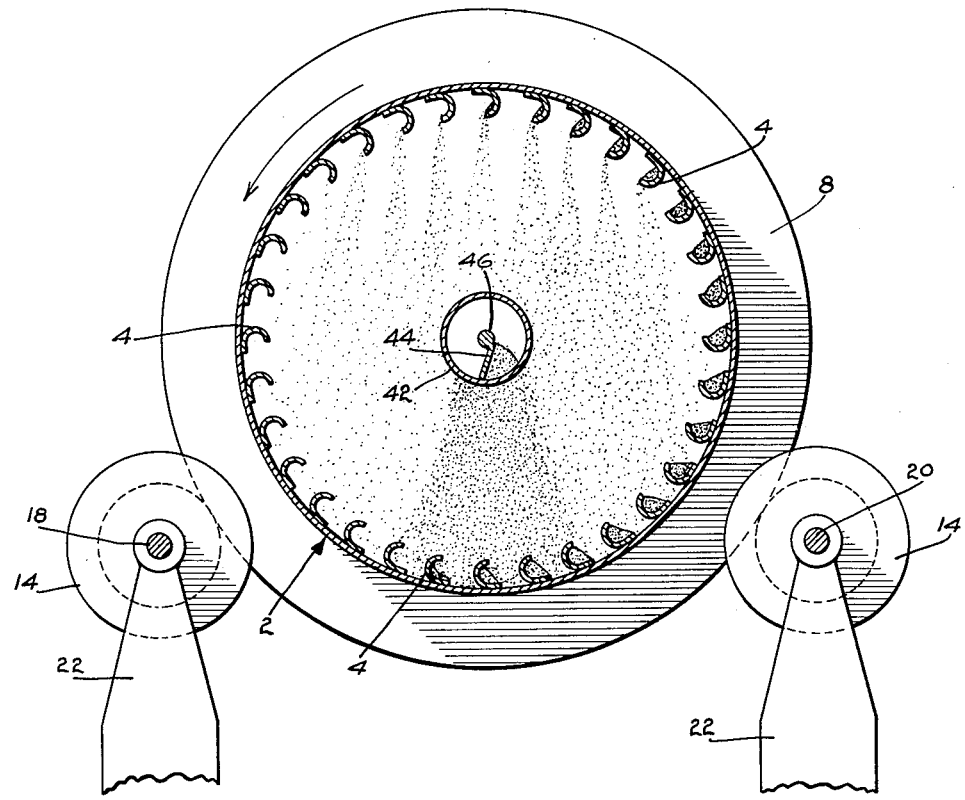

Patented Nov. 20, 1934

1,981,318

UNITED STATES PATENT OFFICE 1,981,318

METHOD OF PRODUCING WHEAT GERM IN WHOLE AND UNFLATTENED STATE

Thomas R. James, Minneapolis, Minn., assignor to General Mills, Inc., Minneapolis, Minn., a corporation of Delaware Application October 29, 1931, Serial No. 571,773

3 Claims. (Cl. 209—2)

This invention relates to a method of separating the germ contained in kernels of wheat. This germ has a number of uses among which might be mentioned its use as a therapeutic agent. It is very rich in vitamins, particularly vitamin B. It is also a source of vitamins E and G, and further contains vitamin A. Physicians prescribe it to be taken raw in its natural state, or in admixture with other foods.

In the usual process of flour milling, wheat is successively passed through corrugated rolls and sifting devices to obtain flour. In the process of flour milling, a stock known as "germ stock" is obtained which is rich in germ but also contains particles of bran and endosperm. Germ stock is thus a stock rich in germ which is produced in any of the usual processes of milling wheat flour.

The following example is illustrative of the formation of germ stock in a typical flour milling process: Wheat is passed through a set of corrugated break rolls and is then introduced into a sifter having a #28 wire sieve and a superposed #18 wire sieve. The stock remaining at the top of the #28 wire sieve is passed to a purifier and the stock from the top of the #18 wire sieve is passed through a second set of corrugated break rolls and thence to a second sifter also having a #28 wire sieve. The stock from the top of this sieve is also passed to the aforementioned purifier. The stock in the purifier is further graded, air being used to prevent the lighter particles from falling through, and the coarser particles, i. e., those not passing through sieves of from #20 to #28 mesh, are passed through corrugated sizing rolls. The stock from the sizing rolls is then passed to a sifter having a screen of #24 wire mesh, and the material taken from the top of this screen is the germ stock. It contains approximately 30% of germ whereas wheat from which none of the bran and endosperm has been removed contains only about 2% of germ. Associated with the germ in the stock are particles of bran and endosperm.

In order to obtain the germ, it has heretofore been the practice to pass the germ stock between smooth surfaced flaking rolls with the result that the germ is flattened while the endosperm is crushed and the bran is not greatly increased in size. The resulting stock is then sifted in a sieve having openings of such size that the flattened germ cannot pass through whereas the relatively unflattened particles of bran and endosperm do pass through the openings. Flattened germ is removed from the top of the sieve.

As a result of being flattened, the germ of course becomes bruised and as a consequence it is difficult to keep it in storage, particularly in warm weather. After being stored for a relatively short time the flattened germ develops an unpleasant odor. It also suffers a change in flavor which produces a sharp, disagreeable taste. Again, there is an increase in acidity which it is believed may bear some relation to the development of the disagreeable taste. Moreover it is unpleasant to eat the flaked germ because of the fact that it distributes itself over the mouth and lodges in spots where it is difficult to remove.

It is a general object of this invention to provide a process in which the wheat germ contained in germ stock may be readily separated from the particles of bran and endosperm associated with it, in a whole and unflattened state. It has been found that germ in a whole and unflattened state possesses far better keeping qualities than the flaked or flattened germ, and that it also has a much more palatable flavor. Again, the whole germ does not distribute itself around the mouth to the extent that the flaked germ does.

The wheat germ itself varies somewhat in size and many of the particles of other substances associated with it in germ stock are very similar to the germ in both size and weight. However, I have found that the germ can be separated from the other particles in the germ stock by subjecting scattered particles of the germ stock to the action of a flowing current of gas such as air. It was found that the germ offers less resistance in relation to its weight to air than do the particles of bran and endosperm.

In accordance with this invention I release scattered particles of germ stock in a current of air flowing in a direction other than that of gravity. Since the germ offers less resistance to the air than the bran and endosperm, it will become separated therefrom, or at least partially separated in which case the operation may be repeated until substantially complete separation is effected.

If desired, the air current in which the particles of germ stock are released may be directed vertically upwardly and in this case the velocity of the air is preferably regulated in such manner that it will raise the particles of bran and endosperm while the germ falls. A velocity which is too great might raise both the germ and the particles associated with it whereas a velocity too low might allow both to fall. By regulating the velocity of the air current, however, a condition may be obtained as described above in which the bran and endosperm particles are raised whereas the germ falls, whereby separation is effected. If desired the air stream may be single and continuous or it may be broken up into a plurality of streams following tortuous paths.

So also, the particles of germ stock may be dropped across an air stream flowing in horizontal or substantially horizontal direction. As the particles drop, the germ follows a vertical line of descent more nearly than the bran and endosperm whereby the separation is effected. Where complete separation is not effected as a result of a single drop across the air stream, the particles may be collected and again dropped across the air stream while their distribution resulting from the first drop is maintained. Further separation will result from the second drop and the operation is continued until the desired separation is obtained.

The accompanying drawings illustrate one form of apparatus in which the separation of the whole germ from the bran and endosperm may be effected, it being understood that the process is capable of being carried out in any desired apparatus wherein the particles of germ stock are subjected to the action of a stream of gas for purposes of separation.

In the drawings, Fig. 1 is a longitudinal section through the apparatus; and

Fig. 2 is a cross section along line 2—2 of Fig. 1.

Referring more particularly to the drawings, numeral 2 designates generally a cylinder on the inner periphery of which are fixed a plurality of vanes or shelves 4, curved in cross section as illustrated in Fig. 2. Fixed on the outer periphery of the cylinder are a plurality of rings 6, 8, 10 and 12. The cylinder 2 is supported by means of a pair of pulleys 14 which engage the ring 8 and by means of a similar pair of pulleys 16 which engage the ring 10. The pulleys 14 and 16 are fixed on a pair of shafts 18 and 20 which are journalled in supports 22 and 24 fixed to the flooring 26.

The cylinder 2 is inclined and extends at its upward end into a casing generally designated at 28 through an opening provided in the wall 30. Rings 6 and 8 are positioned on opposite sides of the wall 30 and are preferably in fairly close engagement therewith. The lower end of casing 28 is in the form of a hopper as at 32. The lower end of cylinder 2 extends into a casing generally designated at 34 through an opening formed in the wall 36, rings 10 and 12 being disposed on opposite sides of the wall 36 and in close engagement therewith. The lower portion of the casing 34 is also in the form of a hopper as at 38.

A feed hopper 40 communicates with a conduit 42 which extends through the casing 34 and into the cylinder 2 to about its center as shown in Fig. 2. The conduit 42 preferably follows the axis of cylinder 2 and has disposed therein a screw conveyer 44 mounted on a shaft 46 which extends outside of hopper 40. The shaft 46 is coupled to a shaft 48 which may be driven by any convenient source of power and has fixed thereon a sprocket which is engaged by a chain 50. The chain 50 further engages a sprocket fixed on shaft 20 in order to drive the same upon rotation of shaft 48. A gear ring 52 which is fixed on the outer periphery of cylinder 2 meshes with a gear wheel 53 which is fixed on the shaft 20.

The casings 28 and 34 are connected by means of a conduit 54, a fan housing 56 and a conduit 58 in addition to being connected by means of the inclined cylinder 2. A fan 60 which is located in the housing 56 is driven from any convenient source of power in a direction to cause a flow of air in the direction indicated by the arrows. If desired, the fan 60 may derive its power from the shaft 48. A regulating damper 62 is disposed in the conduit 58 and may be regulated by means of its handle 64 to control the flow of air through the closed circuit comprising the fan housing 56, conduit 58, casing 34, cylinder 2, casing 28, and conduit 54.

In the operation of the device a quantity of germ stock is placed in the feed hopper 40 wherefrom it is advanced to the end of conduit 42 by means of the screw conveyer 44 which is being driven by the shaft 48. Due to the rotation of shaft 48, the cylinder will be rotated by means of its gear ring 52, the sides of rings 6, 8, 10 and 12 adjacent the walls 30 and 36 forming bearing surfaces therewith.

As the particles of germ stock drop from the end of conduit 42 within the middle of the inclined rotating cylinder 2, they are met by the stream of air flowing in the direction of the arrows with the result that the particles of bran and endosperm are moved in the direction of the upper end of the cylinder whereas the germ particles fall to the bottom of the cylinder at a point nearer its lower end. As the particles reach the bottom of the cylinder they are picked up by the shelves or vanes 4, their distribution resulting from their first drop being maintained, and carried to the top and again dropped across the air stream as illustrated in Fig. 2. This second drop results in a greater separation of the germ particles from the particles of bran and endosperm and the process is continuously repeated until the bran and endosperm particles finally pass out of the upper end of cylinder 2 into the casing 28 to be collected in the hopper portion 32, whereas the wheat germ eventually gravitates to the lower end of the cylinder into casing 34 where it is collected in the hopper 38. The longitudinally extending shelves or the vanes 4 are curved in cross section as shown in Fig. 2 in order to better distribute the stock over the whole cross section of the cylinder. By adjustment of the damper 62, the air velocity through the cylinder 2 may be regulated to a point at which the particles of bran and endosperm are carried to casing 28 whereas the germ gravitates to casing 34.

While I have shown an inclined cylinder with straight, longitudinally extending shelves or vanes it will of course be obvious that one may employ a longitudinally disposed rotating cylinder having helical vanes fixed to its inner periphery to advance the material toward the air inlet end of the cylinder. So also, it is not entirely necessary to employ a closed circuit.

In practice, the germ stock is placed in hopper 40, the shafts 46, 48 and 20 and the fan 56 are placed in rotation, and it is only necessary to remove the wheat germ in its whole and unflattened state, from the hopper portion 38 of the casing 34.

I claim as my invention:

1. The method of separating wheat germ in a whole and unflattened state from germ stock containing wheat germ, and particles of bran and endosperm, which comprises dropping scattered particles of the germ stock across a flowing air current, collecting the particles and maintaining their distribution resulting from their drop across the air current, again dropping the particles as so distributed across an air current, then again collecting the particles and maintaining their distribution resulting from their second drop across the air current, and continuing these operations successively until separation of the wheat germ from the bran and endosperm is effected.

2. The process of recovering wheat germ in a natural unflattened condition from germ stock which consists in feeding germ stock, without being subjected to air currents, to an interior position in a revolving open ended cylinder having an imperforate wall provided with a series of elevating flights; dropping said germ stock through an air current passing longitudinally through said cylinder and causing the same thereafter to be repeatedly lifted to the upper part of said cylinder by said elevating flights and then dropped through said air current, the bran and endosperm in said germ stock being carried away by said air current and passed out of one end of said cylinder while the germ in the natural unflattened condition passes out of the other end of the cylinder.

3. The process of recovering wheat germ in a natural unflattened condition from germ stock which consists in feeding germ stock, without being subjected to air currents, to an interior position in an inclined revolving open ended cylinder having an imperforate wall provided with a series of elevating flights; dropping said germ stock through an air current passing longitudinally through said cylinder in a direction from the lower end toward the raised end thereof and causing the same thereafter to be repeatedly lifted to the upper part of said cylinder by said elevating flights and then dropped through said air current, the bran and endosperm in said germ stock being carried away by said air current and passed out of the raised end of said cylinder while the germ in the natural unflattened condition is passed along the inclined inner lower surface of the cylinder and out at its open lower end.

THOMAS R. JAMES.